United States Patent [19]

van Mil

[11] 3,990,128

[45] Nov. 9, 1976

[54] DEVICE FOR PROCESSING THE ENTRAILS OF SLAUGHTERED POULTRY

[75] Inventor: Martinus Petrus Gerardus van Mil, Boxmeer, Netherlands

[73] Assignee: Stork Brabant B.V., Boxmeer, Netherlands

[22] Filed: Apr. 9, 1974

[21] Appl. No.: 459,402

[30] Foreign Application Priority Data
Apr. 16, 1973  Netherlands....................... 7305321

[52] U.S. Cl. ................................. 17/43
[51] Int. Cl.² ..................................... A22C 17/14
[58] Field of Search ..................... 17/43, 11, 45, 52

[56]  References Cited
UNITED STATES PATENTS

| | | | |
|---|---|---|---|
| 2,630,599 | 3/1953 | Grant et al. | 17/43 |
| 2,697,245 | 12/1954 | Clemens et al. | 17/43 |
| 3,187,376 | 6/1965 | Laws | 17/52 |
| 3,406,425 | 10/1968 | Hill | 17/43 |
| 3,480,991 | 12/1969 | Edwards, Sr. | 17/43 |
| 3,579,714 | 5/1971 | Edwards, Sr. | 17/11 |
| 3,724,029 | 4/1973 | Lewis | 17/11 |
| 3,765,055 | 10/1973 | Lewis | 17/11 |

FOREIGN PATENTS OR APPLICATIONS

| | | | |
|---|---|---|---|
| 858,937 | 1/1961 | United Kingdom | 17/43 |

Primary Examiner—Louis G. Mancene
Assistant Examiner—James D. Hamilton
Attorney, Agent, or Firm—Edmund M. Jaskiewicz

[57] ABSTRACT

A device for processing the intestines of slaughtered poultry, in particular of the gizzards comprising two synchronously driven worm conveyors, engaging each other, the first worm being shorter than the second one, the worms being set with cooperating radially extending carrier members such that the intestines are moved by the carrier members through the space between the cores, while the gizzards, bearing on the cores, are moved on by the second worm to a knife, placed at the end of the worms with the cutting edge directed perpendicular to the axes of the worms.

7 Claims, 3 Drawing Figures

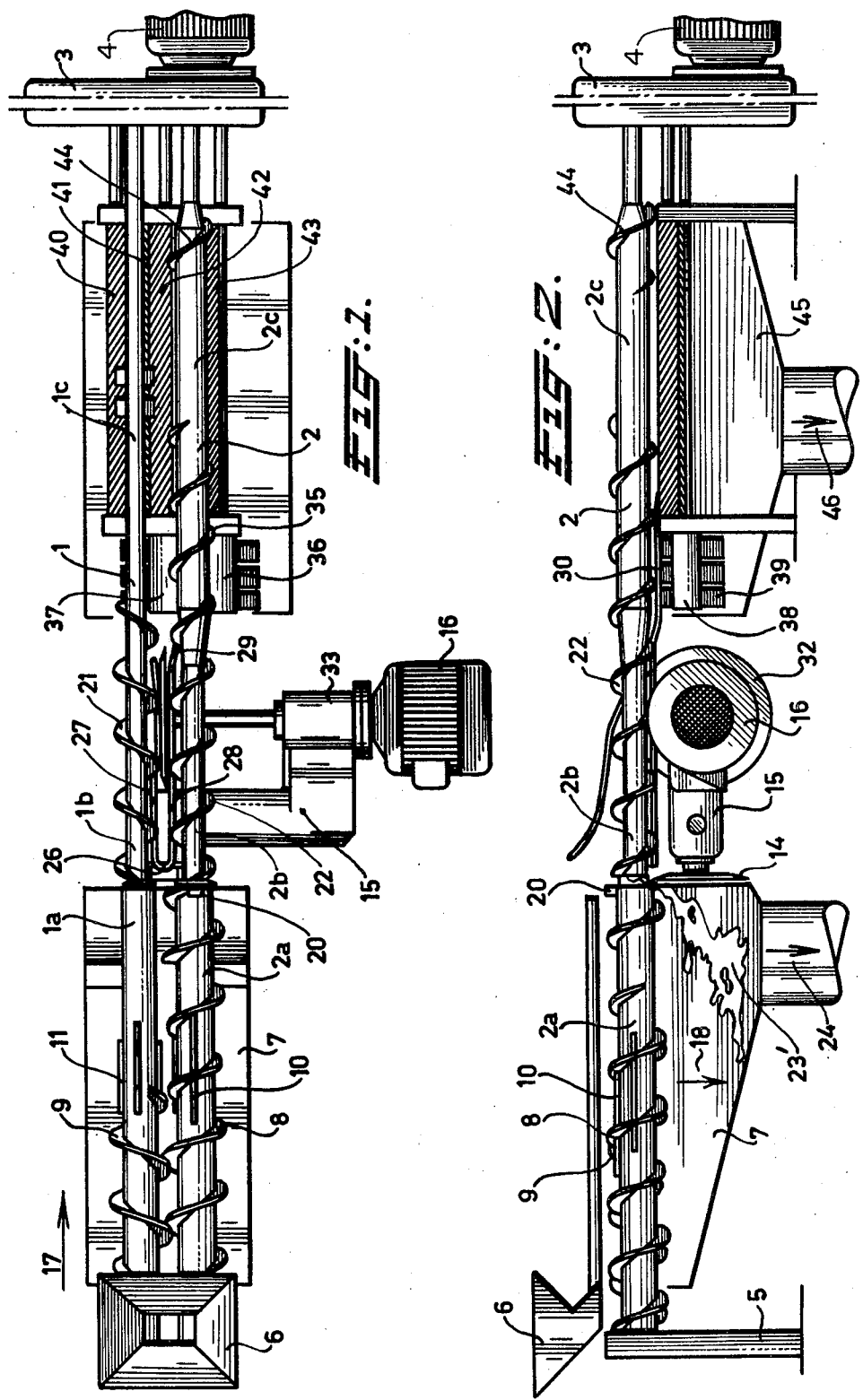

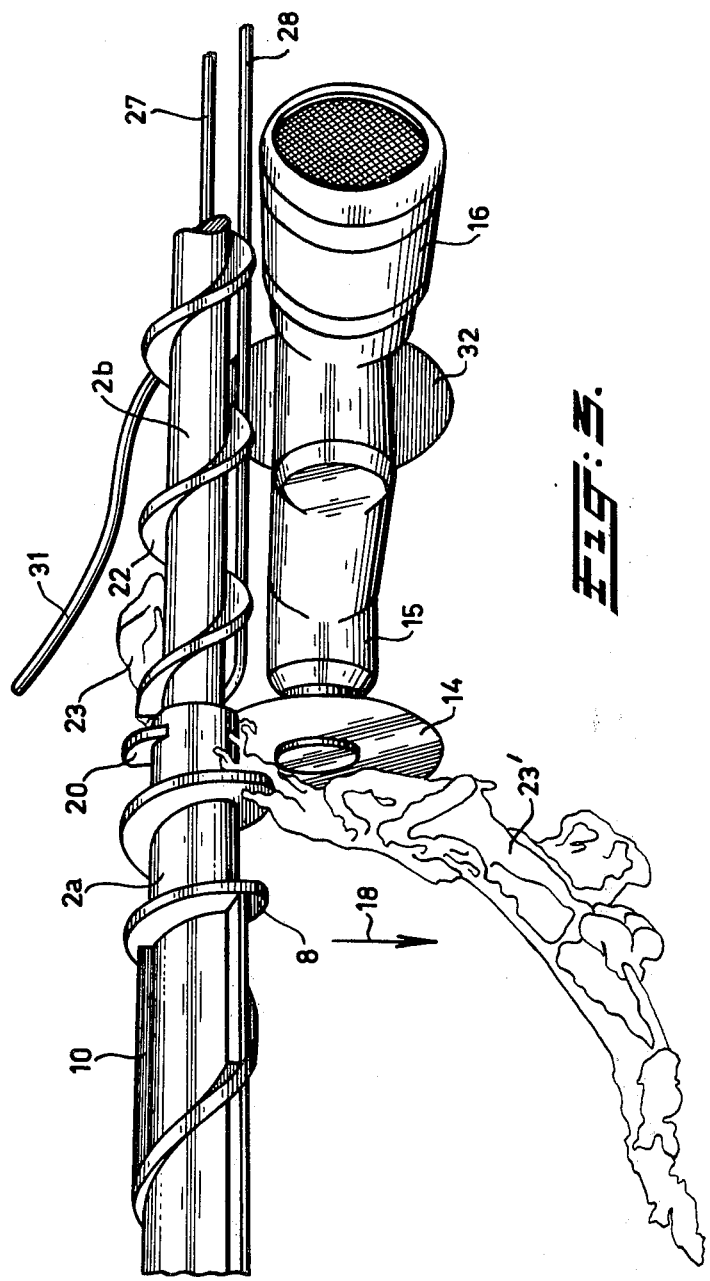

DEVICE FOR PROCESSING THE ENTRAILS OF SLAUGHTERED POULTRY

BACKGROUND OF THE INVENTION

My invention relates to a method for processing the entrails of slaughtered poultry and to a device for treating the intestines of poultry.

In a known way of processing slaughtered poultry the entrails are either mechanically or not, removed from the body whereupon from the package consisting of gizzards, liver, heart, intestines crop and gullet, the liver and the gizzards are severed and the stomach is introduced by hand into a device provided with a chain conveyor for cutting open and washing the same.

This process is performed at a plurality of treatment stations through which the intestines pass.

Since it is increasingly difficult to attract personnel willing to perform this time consuming treatment, there is an urgent need for a method and a device by means of which these treatments can be mechanically performed. It is an object of the invention to provide such a method.

SUMMARY OF THE INVENTION

The method according to my invention provides in that in a continuous process utilizing worm conveyors merging into each other the following treatments are performed:

feeding the complete package of entrails at the inlet ends;

positioning the gizzard with respect to a cutting member;

severing the gizzard from the rest of the package;

positioning the gizzard with respect to a second cutting member;

cutting open the gizzard positioning the gizzard with respect to a mechanical cleaning member;

further conveying and positioning the gizzard to a peeling member for removing the gizzard lining.

Due to my method it is for the first time possible to perform consecutively the various required operations by means of a single device which can be incorporated into the processing line for the poultry. The otherwise required transport between the various treatment stations, with the necessity of intermediate storage, is omitted. The synchronization of the treatments prevents the occurence of a congestion.

A device for processing the intestines of slaughtered poultry according to my invention comprises two mutually parallel worm conveyors which are synchronously driver in opposite directions and engage one the other, each consisting of a core and a helical ribbon disposed around it, and an inlet for the gizzards and the organs including the stomach and intestines connected therewith, which is situated above the inlet end of the pair of worms, while the helical ribbon of the first worm extends from the inlet end over a distance shorter than that of the second worm and the cores of both worms are set with carrier members, distributed in the circumferential direction thereon, protruding radially and extending in axial direction and/or arranged in axial rows, the arrangement being such that on the first worm the members are only disposed on the part thereof which is not provided with a helical ribbon. The carrier members are further preferably arranged in such a way that in the space between the worms the members on the one worm are situated between those on the other worm, while the spacing between the cores of the worms is such that the intestines are moved by the carrier members through the space between the cores, while the gizzards, bearing on the cores, are moved on by the helical ribbon of the cores of the second worms and at the end of the two worms a knife is disposed with a cutting edge perpendicular to the axes of the worms.

The carrier members may consist of oblong projections protruding from the surface of the core while the height of the projections may be substantially equal to the height over which the helical ribbons rise above the core.

On the second worm, and preferably at the location of the end of the helical ribbon a radially protruding cam is provided, while in a preferred embodiment follows, as seen in the direction of conveyance on the first worm a third and follows on the second worm a fourth worm, both with a core diameter which is smaller than that of the preceding core and both carrying a helical ribbon on their entire length, and situated thereunder and thereinbetween two mutually spaced, parallel, guide rods a cutting member thereinbetween and thereabove a guide member extending downwardly as seen in the direction of conveyance.

Preferably a fifth worm is arranged, following on the fourth worm as seen in the direction of conveyance, with a greater core diameter, under which and besides which extends the guide rod cooperating with the fourth worm and under which is arranged at least one scraper, rotating in a plane perpendicular to the direction of conveyance, with radial projections, while on this scraper follow, as seen in the direction of conveyance, a plurality of scraper rollers, situated beside each other in one plane and under the fifth worm, which are driven in pairs so as to rotate in opposite directions and which have helically extending sharp-edged scraper edges on their surface.

When scraper rollers are used then the previously required cleaning of the gizzards, by which operation a very large quantity of polluted water is produced, can almost entirely be omitted. It is now only necessary to wash the gizzards with a rather small quantity of water.

Preferably the first rod, the third rod and a rod situated in alignment therewith on the one hand, as the second, the fourth and the fifth worm on the other hand are coaxially coupled with each other and are commonly driven from one end of the device.

The helical ribbon of the fifth worm may only extend on a portion of the part situated above the scraper rollers, while the end of the core of the fifth worm on a short part of the length thereof, carries a helical ejection ribbon.

THE DRAWINGS

FIG. 1 is a plan view of an embodiment according to my invention;

FIG. 2 is a side elevation of this embodiment;

FIG. 3 is a perspective view of the part of the device where the gizzard is severed from the intestines hanging thereon.

DESCRIPTION OF PREFERRED EMBODIMENTS

The device according to my invention comprises two parallel rotatably supported, cylindrical members 1, 2 which are driven so as to rotate in opposite directions, via a suitable gearing 3, by the motor 4. The members 1 and 2 are provided on a part of their lengths with helical ribbons with a different pitch; the members have mutually different diameters, and parts thereof don't carry a helical ribbon at all.

The members 1 and 2 are supported at their right hand end in a gear box 3 and at their left hand end in bearings in the support 5. Above the left hand end of the members 1 and 2 is disposed a hopper 6 and under the first part of the members 1 and 2, denoted by 1a for the member 1 and 2a for the member 2, these parts adjoining the hopper, is arranged a chute 7. The part 2a has a diameter greater than that of the adjoining part 2b; it is set with a helical ribbon, while the part 1a which likewise has a greater diameter than the adjoining part 1b only carries the helical ribbon 9 on the first part of its length. Moreover the two parts 1a, 2a are set with carrier members 10, 11, respectively extending in the longitudinal direction, which are equidistantly spaced on the circumference of and around the parts, while the members 1 and 2 are coupled with each other in such a way that always one carrier on the one part is situated between two carriers on the other part.

Below the members 1 and 2 and at the location of the end of the parts 1a, 2a is disposed, in a plane perpendicular to the longitudinal axis thereof, a cutting disc 14 which is driven in rotation via a suitable gearing 15 driven by a motor 16.

The function of the aformentioned parts is: the severing of the gizzard from internal parts hanging thereon (crop and gullet). This is effected as follows:

The worms which are driven so as to rotate in opposite directions convey the intestines, which via the hopper 6 are introduced into the space between the cylindrical cores of the parts 1a, 2a in the direction of the arrow 17. The distance between the centerlines of the cylindrical members 1, 2 and the diameters of the parts 1a, 2a is selected in such a way that the gizzards do not fall from between the parts 1a, 2a , but the intestines hanging thereon are pressed away downwardly, consequently in the direction of the arrow 18, by the carrier members 11. After some revolutions the situation shown in FIG. 3 as gizzards 23 with intestines 23' connected therewith arises.

The package of intestines 23' is hanging under the parts 1a, 2a and the gizzard 23 is bearing on the outer surfaces of these parts. Owing to the fact that the intestines are hanging under these parts the gizzard remains in contact with the worm ribbon 9 on the part 2a and in spite of the fact that on the second portion of the part 1a no helical ribbon is provided it is nevertheless further conveyed in the direction of the arrow 17. Due to the absence of the second helical ribbon the gizzard can, however, freely assume a particular position.

At the end of the part 2a there is provided a radially protruding cam 20 situated slightly before the rotating cutting disc 14. At that location the parts 1a, 2a merge into the parts 1b, 2b with a smaller diameter and set with helical ribbons 21, 22 respectively. When the gizzard with the package of intestines hanging thereon is past the bridge part between the parts 1a, 2a and as a consequence further conveyed towards the right by the helical ribbons 21, 22 then, as soon as the gizzard lies almost completely in the space between two consecutive helical ribbons, the cam 20, turning to the left as seen in the direction of the arrow 17, will press downwardly the back part of the gizzard, with which the gullet is still connected, into the cutting disc 14.

The intestines 23' are severed, fall into the chute 7 and are discharged at 24.

The severed gizzard in order to be cleaned, must now be cut open and unfolded. This operation is performed by the members following on the parts 1b, 2b, to wit: below and between the parts 1a, 1b two oblong, mutually parallel, guide rods 27, 28, interconnected via a curved part 26 at the right hand end of the part 1a, 1b, the guide rod 27 of which is shorter than the rod 28 which merges into an obliquely outwardly extending part 29 which is continued by an end part 30 extending again in a direction parallel to the axes of the parts 1, 2. Above that part is a push rod 31 sloping in the direction of the arrow 17, while a cutting disc 32 is arranged between the parts 1b, 2b, the disc is driven by the motor 16 via the transmission 33.

A gizzard which by the helical ribbons 21, 22 is conveyed in the direction of the arrow 17 comes, when situated between the helical ribbons, to lie on the guide rods 27 and 28 and is conveyed by the helical ribbons across the cutting edge 32. The gizzard is then longitudinally cut through and, after having passed by the cutting knife 32, it is then further conveyed by the helical ribbons 21, 22.

This further conveyance is initially effected by the helical ribbon parts 1b, 2b, in common; the part 1b continues, however into a part 1c, without helical ribbons, whereas the part 2b merges into a part 2c, with a greater diameter on which is provided the helical ribbon 35. Under the beginning of the helical ribbon 35 are two scrapers 36, 37 both constructed with a shaft 38 with blades 39 radially protruding therefrom. The gizzard which is hanging on the guide rod 30, is further conveyed by the helical ribbon 35 and is internally scraped clean by the scraper blades.

It should be noted that after this scraping clean the conventional washing of the gizzard is almost superfluous, which not only results into a considerable saving on water but also into a considerable decrease of the quantity of polluted water produced during the processing of the poultry, The lining covering the inner wall of the gizzards, which are now cleaned for the greater part, should then be removed. This is done by means of four peeling rollers 40, 41, 42, 43 below the parts 1c, 2c, arranged parallel to the axes thereof and driven in pairs in opposite directions from the gear box 3. The gizzards are advanced by the helical ribbons 35 until they land on the peeler rollers and are then further conveyed by the peeler rollers themselves; they are now lying under the parts 1c, 2c. At the extreme right hand end the part 2c carries a helical ribbon part 44 which removes the gizzards from the peeling ribbons.

Under the unit consisting of the scrapers and the peeling rollers a suction chute 45 is mounted where the offal is discharged at 46.

What I claim is:

1. A device for processing the entrails, particularly the gizzard, of slaughtered poultry, comprisng a pair of spaced parallel first and second worm conveyors synchronously driven in opposite directions and each comprising a core and a helical ribbon therearound, means at one end of said pair of conveyors for defining an inlet for the gizzard and organs including the stomach and intestines connected therewith, a helical ribbon on said first conveyor extending from said inlet end thereof a distance shorter than the helical ribbon on said second conveyor, a first plurality of axially extending radially projecting circumferentially spaced carrier members on said first conveyor on the portion thereof beyond said helical ribbon, a second plurality of axially extending radially projecting circumferentially spaced carrier members on the helical ribbon portion of said second conveyor and opposed and intermeshing with said first carrier members, the space between said conveyor cores being such that the gizzards are moved by said helical ribbons upon said conveyors while the intestines are moved by said carrier members through the space between said cores, radially protruding means on said second worm at the end of the helical ribbon thereon for pressing the gizzard upon said conveyors, a knife at the end of said conveyors having its cutting edge perpendicular to and directed toward said conveyor axes for separating the gizzard from the intestines as the gizzard is being pressed upon the conveyors, means subsequent to said worm conveyors and said knife in the direction of conveyance for conveying the separated gizzard and for unfolding and cutting open the gizzard while it is being conveyed, and means subsequent to said unfolding and cutting open means in the direction of conveyance for scrapping the interior of the cut open gizzard.

2. A device according to claim 1, wherein the carrier members consist of oblong projections from the surface of the core.

3. Device according to claim 2, wherein the height of the projections is substantially equal to the height of the worm ribbons above the core.

4. A device according to claim 1 wherein, as seen in the direction of conveyance a third worm following the first worm and a fourth worm following the second worm each of said third and fourth worms having a core diameter which is smaller than that of the preceding core and both said third and fourth worms carrying a helical ribbon along their entire length, a cutting member below said third and fourth worms and extending upwardly therebetween, a guide member above said third and fourth worms and extending downwardly as seen in the direction of conveyance.

5. A device according to claim 4, in which as seen in the direction of conveyance, a fifth worm conveyor with a greater core diameter following said fourth conveyor, a guide rod cooperating with the fourth worm and extending under and beside said fifth conveyor, at least one scraper having radial projections and under said fifth conveyor, rotating in a plane perpendicular to the direction of conveyance as seen in the direction of conveyance, a plurality of scraper rollers following said scraper and situated beside each other in one plane and under the fifth worm, said plurality of scrapers arranged in pairs and driven so as to rotate in opposite directions the surface of each of said plurality of conveyors having helically extending sharpedged sraper edges.

6. A device according to claim 5, wherein the first worm, the third worm and a core situated in alignment therewith on the one hand and the second, the fourth and the fifth worm on the other had being coaxially coupled with each other and commonly driven from one end of the device.

7. A device according to claim 6, wherein the helical ribbon on the fifth worm extends only on a portion thereof above the scraper rollers, the end of said worm core carrying on a short part thereof a helical ejection ribbon.

* * * * *